US012774783B2

(12) United States Patent
Mehta et al.

(10) Patent No.: US 12,774,783 B2
(45) **Date of Patent: *Oct. 27, 2026**

(54) PRECAST, PRESTRESSED CONCRETE CRYOGENIC TANKS—SLIDING BASE INSULATION SYSTEM AND METHOD FOR FULL AND DOUBLE CONTAINMENT SYSTEMS

(71) Applicant: PRELOAD CRYOGENICS, LLC, Quincy, MA (US)

(72) Inventors: Sanjay Mehta, Hauppauge, NY (US); Eric T. Reaman, Hingham, MA (US)

(73) Assignee: PRELOAD CRYOGENICS, LLC, Quincy, MA (US)

(*) Notice: Subject to any disclaimer, the term of this patent is extended or adjusted under 35 U.S.C. 154(b) by 28 days.

This patent is subject to a terminal disclaimer.

(21) Appl. No.: 18/933,424

(22) Filed: Oct. 31, 2024

(65) Prior Publication Data

US 2025/0060071 A1 Feb. 20, 2025

Related U.S. Application Data

(63) Continuation of application No. 17/954,704, filed on Sep. 28, 2022, now Pat. No. 12,215,827.

(Continued)

(51) Int. Cl.

*F17C 3/02* (2006.01)
*E04H 7/20* (2006.01)

(52) U.S. Cl.

CPC ............... *F17C 3/022* (2013.01); *E04H 7/20* (2013.01); *F17C 2201/032* (2013.01);

(Continued)

(58) Field of Classification Search

CPC ................ F17C 3/022; F17C 2201/032; F17C 2203/012; F17C 2203/0304;

(Continued)

(56) References Cited

U.S. PATENT DOCUMENTS 2,777,295 A 1/1957 Bliss et al.
3,092,933 A 6/1963 Closner et al.

(Continued)

FOREIGN PATENT DOCUMENTS

CN 111473243 B 8/2022
EP 0066276 B1 11/1985

(Continued)

OTHER PUBLICATIONS

Vanessa Tietze, Sebastian Luhr, and Detlef Stolten, "Bulk Storage Vessels for Compressed and Liquid Hydrogen".

(Continued)

*Primary Examiner* — Shawn M Braden

(74) *Attorney, Agent, or Firm* — Jacob M. Ward; Ward Law Office LLC

(57) ABSTRACT

A storage system is provided that includes a primary container, a first insulation layer, a secondary container, a secondary bottom, and a second insulation layer. The primary container has a primary bottom. The first insulation layer is disposed below the primary bottom. The secondary bottom is disposed below the first insulation layer and the secondary container. The secondary bottom has an expansion joint configured to permit the secondary bottom to expand and/or contract independently from the secondary container. The second insulation layer is disposed below the secondary bottom. In the event of LNG leaking from the primary container, the second insulation layer is protected from LNG contact by the secondary bottom. The carbon steel liner located on the outside face of the concrete wall remains vapor tight and liquid tight in the event of any amount of LNG leaking from the primary container.

18 Claims, 7 Drawing Sheets

Related U.S. Application Data

(60) Provisional application No. 63/249,205, filed on Sep. 28, 2021.

(52) U.S. Cl.
CPC ................... *F17C 2203/012* (2013.01); *F17C 2203/0304* (2013.01); *F17C 2203/0604* (2013.01); *F17C 2203/0626* (2013.01); *F17C 2203/0639* (2013.01); *F17C 2203/0678* (2013.01); *F17C 2221/033* (2013.01); *F17C 2223/0161* (2013.01); *F17C 2260/036* (2013.01)

(58) Field of Classification Search
CPC ...... F17C 2203/0604; F17C 2203/0626; F17C 2203/0639; F17C 2203/0678; F17C 2221/033; F17C 2223/0161; F17C 2260/036; E04H 7/20; Y02E 60/32
See application file for complete search history.

(56) References Cited

U.S. PATENT DOCUMENTS

| | | | | |
|---|---|---|---|---|
| 3,215,313 | A | 11/1965 | Stelts | |
| 3,488,972 | A | 1/1970 | Closner | |
| 3,511,435 | A | 5/1970 | Hewitt et al. | |
| 3,558,000 | A | 1/1971 | Mccann et al. | |
| 3,860,140 | A | 1/1975 | Wichman et al. | |
| 4,021,982 | A | 5/1977 | Kotcharian | |
| 4,041,722 | A | 8/1977 | Terlesky et al. | |
| 5,018,639 | A | 5/1991 | Schafer | |
| 5,386,706 | A | 2/1995 | Bergsten et al. | |
| 8,162,167 | B2 | 4/2012 | Da Silva et al. | |
| 9,284,120 | B2 | 3/2016 | Oates | |
| 10,597,888 | B2 | 3/2020 | Mehta et al. | |
| 2005/0144834 | A1 | 7/2005 | Jimeson et al. | |
| 2005/0144864 | A1 * | 7/2005 | Skovholt ................. | F17C 3/022 52/223.3 |
| 2016/0091140 | A1 | 3/2016 | Takagi et al. | |
| 2021/0131610 | A1 | 5/2021 | Kim et al. | |
| 2023/0008486 | A1 | 1/2023 | Mehta et al. | |
| 2023/0094744 | A1 | 3/2023 | Mehta et al. | |

FOREIGN PATENT DOCUMENTS

| | | | |
|---|---|---|---|
| EP | 3317577 | B1 | 5/2021 |
| WO | 2002048602 | A1 | 6/2002 |
| WO | 2006046872 | A1 | 5/2006 |
| WO | 2008154169 | A1 | 12/2008 |
| WO | 2017018699 | A1 | 2/2017 |

OTHER PUBLICATIONS

Joakim Andersson and Stefan Gronkvist, "Large-Scale Storage of Hydrogen", Division of Energy Processer, KTH Royal Institute of Technology, SE-10044 Stockholm, Sweden.
Steward S.A., "Review of Hydrogen Isotope Permeability Through Materials," Lawrence Livermore National Laboratory, University of California, Aug. 15, 1983.
George R. Caskey, "Hydrogen Compatibility Handbook for Stainless Steels," Savannah River Laboratory, Aiken, SC 29808, Jun. 1983.
Chris San Marchi and B.P. Somerday, "Technical Reference for Hydrogen Compatibility of Materials," Sandia Report-SAND2012-7321, Sep. 2012.
B. W. Birmingham, E. H. Brown, C. R. Class, and A. F. Schmidt, "Vessels for the Storage and Transport of Liquid Hydrogen," Journal of Research of the National Bureau of Standards, vol. 58, No. 5, May 1957.
Bob Granath, "Innovative Liquid Hydrogen Storage to Support Space Launch Program," NASA Technical Brief, Last updated on Dec. 4, 2019.
The Perlite Institute, Inc., "Properties of Evacuated Perlite," 4305 North Sixth Street, Suite A, Harrisburg, PA 17110.
W U Notardonato, et al, "Zero Boil-off Methods for Large-Scale Liquid Hydrogen Tanks Using Integrated Refrigeration and Storage", IOP Conf. Series: Materials Science and Engineering, 2017.
Hjorteset et al., Development of large-scale precast, prestressed concrete liquefied natural gas storage tanks, Article, PCI Journal, Fall 2013, pp. 40-54, vol. 58, U.S.
Written Opinion of the International Searching Authority dated Dec. 29, 2022.
Written Opinion of the International Searching Authority dated Oct. 13, 2022.

* cited by examiner

PRECAST, PRESTRESSED CONCRETE CRYOGENIC TANKS—SLIDING BASE INSULATION SYSTEM AND METHOD FOR FULL AND DOUBLE CONTAINMENT SYSTEMS

CROSS-REFERENCE TO RELATED APPLICATIONS

This application is a continuation of U.S. application Ser. No. 17/954,704, filed Sep. 28, 2022, which claims the benefit of U.S. Provisional Application No. 63/249,205, filed on Sep. 28, 2021. The entire disclosures of the above applications are incorporated herein by reference.

FIELD

The disclosure generally relates to storage systems and, more particularly, to insulated storage systems for cryogenic fluids, including liquid natural gas.

INTRODUCTION

This section provides background information related to the present disclosure which is not necessarily prior art.

Liquid Natural Gas (LNG), such as liquid methane and other cryogenic liquids, is used in certain energy producing systems where the LNG is stored at very low temperatures. Known methods for storing LNG include providing storage tanks. These storage tanks require certain features to adequately store LNG in an efficient manner in a primary storage tank and protect the adjacent property in the event that LNG may leak from the primary tank. Typically, the primary storage tank is enclosed by a secondary container that holds insulation material to keep the stored LNG at cryogenic temperature and reduce boil-off. The secondary container may also be designed to withstand a sudden thermal shock associated with a leak of LNG from the primary container, with respect to double containment and full containment tank systems. Specifically, the design and the materials constructing the secondary storage tank must be configured to withstand a sudden extreme shift in temperature change when the cold LNG leaks from the primary storage tank. For instance, when the cold LNG leaks from the primary storage tank, the materials forming the secondary container tend to retract at the molecular level due to the sudden shift in temperature through conduction and may possibly crack.

Current secondary containers of full containment and double containment systems have been designed and built using a concrete wall with a carbon steel liner on the inside face. In the event that leaked LNG contacts the sidewall of the secondary container, the LNG may undesirably crack the carbon steel liner and lead to a release of gas vapor to the atmosphere. Current secondary containers may use a thermal corner protection (TCP) system near a lower portion to prevent a sudden thermal shock to the concrete wall and thus prevent cracking in case LNG leaks and accumulates at the base of the secondary container. The TCP is a layer of insulation protected by the steel liner that is rated for cryogenic temperature in the event of an LNG leak. The steel liner, rated for cryogenic temperature, contracts in response to a sudden temperature drop without compromising the integrity of insulation and the wall base behind it. Typically, the TCP is provided for the bottom 15 ft of the sidewall. However, the leaked LNG may exceed the height of the TCP and then crack the carbon steel liner provided on the inside face of the secondary container. The TCP is provided for secondary container with a fixed base, which is unable to accommodate the retraction resulting from a sudden temperature drop in the event of LNG leak from the primary container. Also, the additional insulation and steel required to form the TCP is costly and difficult to fabricate with necessary quality control and quality assurance.

What is more, the cold temperature of the stored LNG may also undesirably impact the foundation of the storage tank due to inadequate insulation. For instance, certain storage tanks provide a layer of insulation between the stored LNG and the foundation of the storage tank. This layer of insulation serves to provide a buffer between the natural temperature of the foundation and the cold temperature of the LNG. Without the layer of insulation, the cold temperature of the LNG would cause a sudden change in temperature to the foundation and result in cracks forming and possibly leaking LNG into a soil surface beneath the foundation. However, this layer of insulation may become compromised and quickly saturated with leaked LNG. When the LNG saturates the layer of insulation, the foundation will have no buffer or protection from the cold temperatures of the LNG, resulting in cracks in the foundation due to the sudden change in temperature.

Accordingly, there is a need for a storage tank capable of efficiently storing LNG and eliminating the risk of vapor release in case leaked LNG from the primary storage tank contacts the secondary container at any elevation. Such a storage tank should also protect the foundation from a sudden thermal shock. Finally, such a storage tank should also prevent the LNG leak from the wall base joint by providing a retracting capability in case of a sudden temperature drop.

SUMMARY

In concordance with the instant disclosure, a storage tank capable of efficiently storing LNG, effectively eliminating risk of vapor release, capable of protecting a foundation from cryogenic temperatures, and at the same time, preventing an LNG leak from the wall base joint of the secondary container, has been surprisingly discovered.

A storage system is provided that includes a primary container, a first insulation layer, a secondary container, a secondary bottom, and a second insulation layer. The primary container may have a primary bottom. The first insulation layer may be disposed below the primary bottom. The secondary bottom may be disposed below the first insulation layer. The secondary bottom may have an expansion joint. The second insulation layer may be disposed below the secondary bottom. In certain embodiments, the second insulation layer may be disposed in a reservoir, between the secondary bottom and a concrete floor, which extends radially outwards from the edge of the primary bottom. The secondary container may have an outer carbon steel liner starting a few feet above the base of the wall. The carbon steel liner may be welded to a 9% Ni liner extending to the wall base. The extended 9% Ni portion of the liner may be welded to the secondary bottom.

In certain embodiments, a cryogenic storage system may include a primary container, a first insulation layer disposed below a primary bottom of the primary container, a secondary container disposed outward of the primary container; and a secondary bottom coupled to the secondary container. The secondary bottom may be coupled to the secondary container through an expansion joint. The expansion joint may be configured to permit an expansion and a retraction of the secondary bottom independent from the secondary container. The cryogenic storage system may further include a second insulation layer disposed below the secondary bottom.

In certain embodiments, a thermal element may be disposed in soil beneath the second insulation layer. The thermal element may be configured to militate against a rapid change in temperature of the soil if a cryogenic liquid leaks from the cryogenic storage system. The secondary bottom may include a sand layer below the primary container and a slide bearing below the secondary container. In certain embodiments, each of the sand layer, the slide bearing, and the expansion joint permit the secondary bottom to move independent from the secondary container.

A sketch plate may be disposed above the slide bearing, where the sketch plate is configured to militate against leaked cryogenic liquid from escaping the cryogenic liquid storage system. The sketch plate may further include steel that is configured to militate against leaked cryogenic liquid from escaping the cryogenic storage system. In certain embodiments, the sketch plate may include approximately 9% nickel.

The cryogenic storage system may be configured to store liquified natural gas. In certain embodiments, the secondary container may include an outer carbon steel liner. The primary container, the primary bottom, and the secondary bottom may include one of nickel based steel and stainless steel. The secondary container may include one of a precast and a cast-in-place prestressed concrete wall. In certain embodiments, the secondary container may further include a carbon steel liner disposed on an outside face of the secondary container. An entirety of the secondary container wall may be circumferentially prestressed using high strength steel wires encapsulated in shotcrete. The secondary container may be formed by precast concrete walls, having an outer carbon steel liner. Prestressed wire may be disposed on an outer surface of the outer carbon steel liner. In certain embodiments, the second insulation layer is disposed below a concrete footing of the secondary bottom in a reservoir.

Various ways of assembling the storage system are provided. Certain methods may include a step of providing a primary container having a primary bottom, a first insulation layer, a second insulation layer, a secondary container, and a secondary bottom. The secondary bottom may have an expansion joint. Next, the method may include a step of disposing the second insulation layer in a desired position. The secondary bottom may then be disposed on the second insulation layer. Then, the secondary container may be placed on the secondary bottom. Afterwards, the first insulation layer may be positioned on the secondary bottom of the secondary container. Then, the primary container may be disposed on the first insulation layer. In certain embodiments, an annular space may be created between the primary container and the secondary container.

In certain embodiments, a method of assembling a cryogenic storage system may include providing a primary container having a primary bottom, disposing a first insulation layer below the primary bottom, disposing a secondary container outward of the primary container, and coupling a secondary bottom to the secondary container through an expansion joint. The expansion joint may be configured to permit an expansion and a retraction of the secondary bottom independent from the secondary container. A sand layer, a slide bearing, and the expansion joint may permit the secondary bottom to move independent from the secondary container. In certain embodiments, the method may comprise storing a cryogenic liquid in the cryogenic storge system. The cryogenic liquid may be LNG. An outer carbon steel liner may be disposed onto the secondary container.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
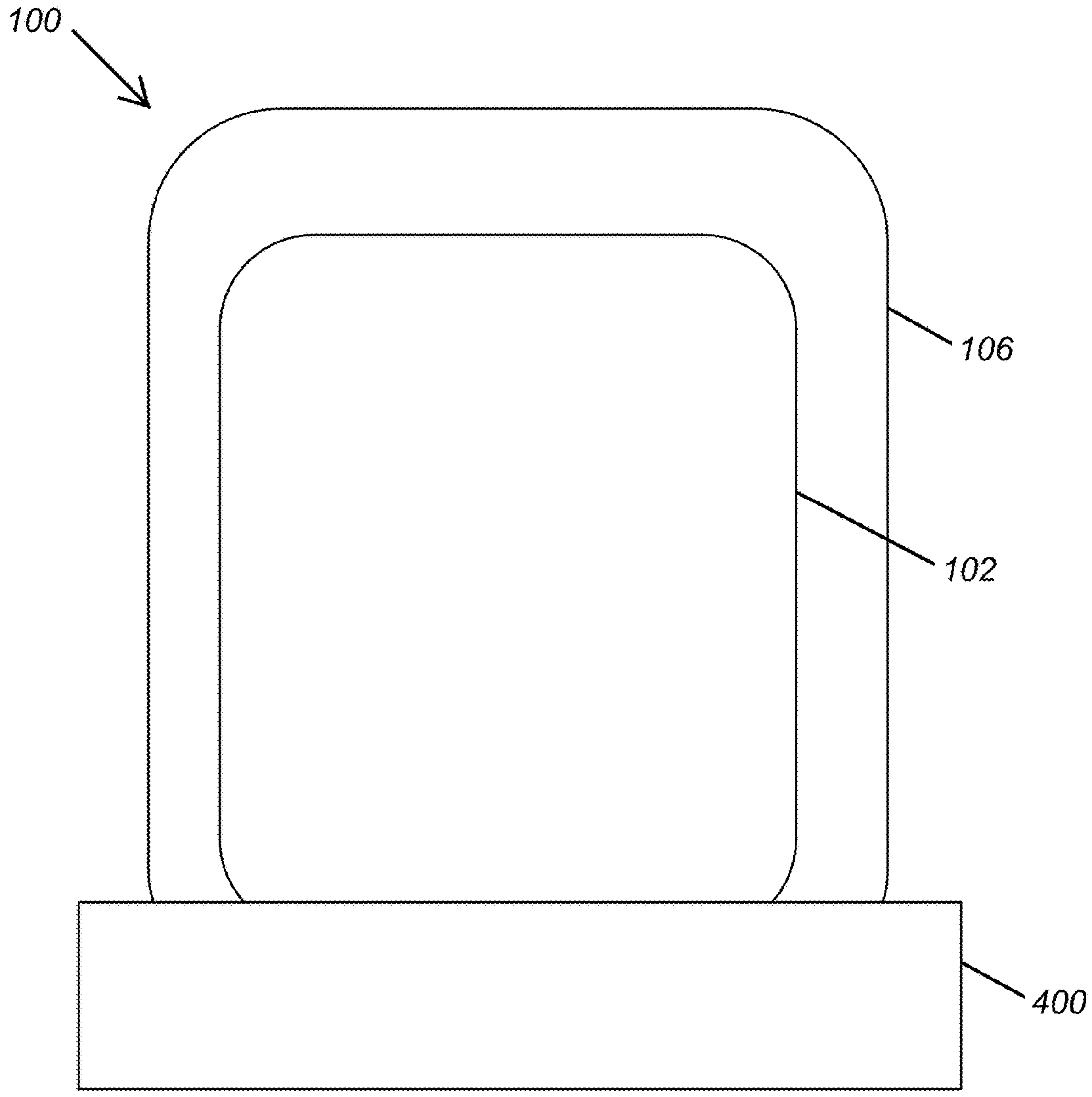
FIG. 1 shows a schematic view of a storage system, in accordance with the present technology, including a primary container surrounded by a secondary container, where the primary container and the secondary container are resting on a base.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. “A” and “an” as used herein indicate “at least one” of the item is present; a plurality of such items may be present, when possible. Except where otherwise expressly indicated, all numerical quantities in this description are to be understood as modified by the word “about” and all geometric and spatial descriptors are to be understood as modified by the word “substantially” in describing the broadest scope of the technology. “About” when applied to numerical values indicates that the calculation or the measurement allows some slight imprecision in the value (with some approach to exactness in the value; approximately or reasonably close to the value; nearly). If, for some reason, the imprecision provided by “about” and/or “substantially” is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology relates to a cryogenic liquid storage system. The cryogenic storage system may include a primary container, a first insulation layer disposed below a primary bottom of the primary container, a secondary container disposed outward of the primary container; and a secondary bottom coupled to the secondary container. The secondary bottom may be coupled to the secondary container through an expansion joint. The expansion joint may be configured to permit an expansion and a retraction of the secondary bottom independent from the secondary container. The cryogenic storage system may further include a second insulation layer disposed below the secondary bottom.

In certain embodiments, a thermal element may be disposed in soil beneath the second insulation layer. The thermal element may be configured to militate against a rapid change in temperature of the soil when a cryogenic material is leaked in the cryogenic storage system. The secondary bottom may include a sand layer below the primary container and a slide bearing below the secondary container. In certain embodiments, each of the sand layer, the slide bearing, and the expansion joint permit the secondary bottom to move independent from the secondary container.

A sketch plate may be disposed above the slide bearing, where the sketch plate is configured to militate against leaked cryogenic liquid from escaping the cryogenic liquid storage system. The sketch plate may further include steel that is configured to militate against leaked cryogenic liquid from escaping the cryogenic storage system. In certain embodiments, the sketch plate may include approximately 9% nickel.

The cryogenic storage system may be configured to store liquified natural gas. In certain embodiments, the secondary container may include an outer carbon steel liner. The primary container, the primary bottom, and the secondary bottom may include one of nickel based steel and stainless steel. The secondary container may include one of a precast and a cast-in-place prestressed concrete wall. In certain embodiments, the secondary container may further include a carbon steel liner disposed on an outside face of the secondary container. An entirety of the secondary container wall may be circumferentially prestressed using high strength steel wires encapsulated in shotcrete. The secondary container may be formed by precast concrete walls, having an outer carbon steel liner. Prestressed wire may be disposed on an outer surface of the outer carbon steel liner. In certain embodiments, the second insulation layer is disposed below a concrete footing of the secondary bottom in a reservoir.

A method of assembling a cryogenic storage system may include providing a primary container having a primary bottom, disposing a first insulation layer below the primary bottom, disposing a secondary container outward of the primary container, and coupling a secondary bottom to the secondary container through an expansion joint. The expansion joint may be configured to permit an expansion and a retraction of the secondary bottom independent from the secondary container. A sand layer, a slide bearing, and the expansion joint may permit the secondary bottom to move independent from the secondary container. In certain embodiments, the method may comprise storing a cryogenic liquid in the cryogenic storge system. The cryogenic liquid may be LNG.

Advantageously, the cryogenic storage system is capable of efficiently storing LNG and effectively eliminating the risk of liquid and vapor release in the event of LNG leaking from the primary container, through the use of an expansion joint, a carbon steel outer liner, and a secondary bottom and a second insulation layer.

EXAMPLES

Example embodiments of the present technology are provided with reference to the several figures enclosed herewith.

FIG. 1 shows a schematic view of a cryogenic storage system 100. The cryogenic storage system 100 may include a primary container 102 and a secondary container 106, disposed upon a base 400. The base 400 may include additional components as shown in FIGS. 2-5. For example, the base 400 may include a first insulation layer 104 disposed below the primary bottom 112. A secondary bottom 108 may be disposed below the first insulation layer 104. In certain embodiments, a second insulation layer 110 may be disposed below the secondary bottom 108.

As shown in FIGS. 2-5, the cryogenic storage system 100 may include the primary container 102, the first insulation layer 104, a secondary container 106, the secondary bottom 108, and the second insulation layer 110. The primary container 102 may have the primary bottom 112. The first insulation layer 104 may be disposed below the primary bottom 112. The secondary bottom 108 may be disposed below the first insulation layer 104. The secondary bottom 108 may have an expansion joint 114. The second insulation layer 110 may be disposed below the secondary bottom 108. In certain embodiments, the secondary container 106 may have an outer carbon steel liner 116.

The primary container 102, the primary bottom 112, the secondary container 106, and/or the secondary bottom 108 may have certain functionalities that may be performed by various types of materials. For example, the primary container 102, the primary bottom 112, and/or the secondary bottom 108 may include nickel-based steel or stainless steel. In certain embodiments, the nickel-based steel may include around 9% nickel. Advantageously, the 9% nickel steel and stainless steel materials may enhance the structural integrity of the primary container 102 and primary bottom 112. The secondary container 106 may include a precast or cast-in-place prestressed concrete wall 118 with a carbon steel liner 116. The precast, prestressed concrete wall 118 may be made as a composite with a carbon steel liner 116 located on the outside face 117 of the concrete wall 118. The bottom portion of this liner may be fabricated from 9% nickel-based steel instead of carbon steel. An entire secondary container wall may be circumferentially prestressed using high strength steel wires encapsulated in shotcrete. One skilled in the art may select other suitable materials to construct the primary container 102, the primary bottom 112, the secondary container 106, and/or the secondary bottom 108 within the scope of the present disclosure.

In certain embodiments, the second insulation layer 110 may be disposed below a concrete footing by forming a reservoir between the secondary bottom 108 and concrete floor. Where the second insulation layer 110 is disposed as shown in FIG. 1, the second insulation layer 110 may be advantageously protected by the secondary bottom 108 if LNG leaks from the primary container 102 or primary bottom 112. For instance, where LNG is leaked within the cryogenic storage system 100, the secondary bottom 108 would be configured to militate against the leaked LNG from saturating the second insulation layer 110. Desirably, the second insulation layer 110 would then still provide an insulative buffer militating against a rapid change in temperature in the soil beneath the cryogenic storage system 100, where LNG is leaked within the cryogenic storage system 100.

Figure 2:
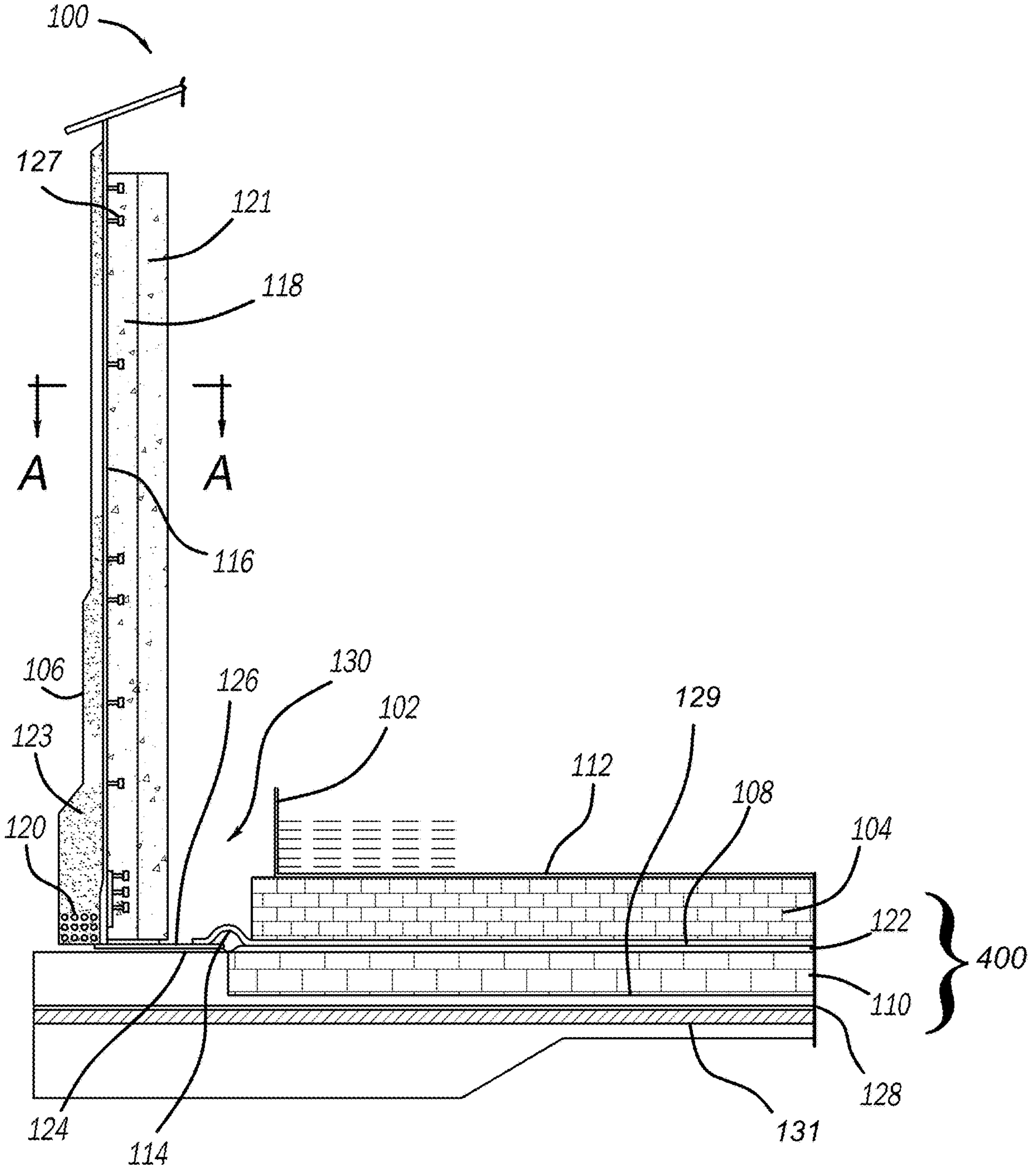
FIG. 2 shows a fragmentary view of a storage system, in accordance with the present technology, including portions of a primary container, a primary bottom, a secondary container, a secondary bottom, and where the secondary bottom is coupled to the secondary container through an expansion joint.

As shown in FIG. 2, the secondary container 106 may include a carbon steel liner 116 formed compositely with a concrete material. In certain embodiments, the concrete material may include shotcrete 123. The shotcrete 123 may encapsulate the prestressed wire 120.

Figure 3:
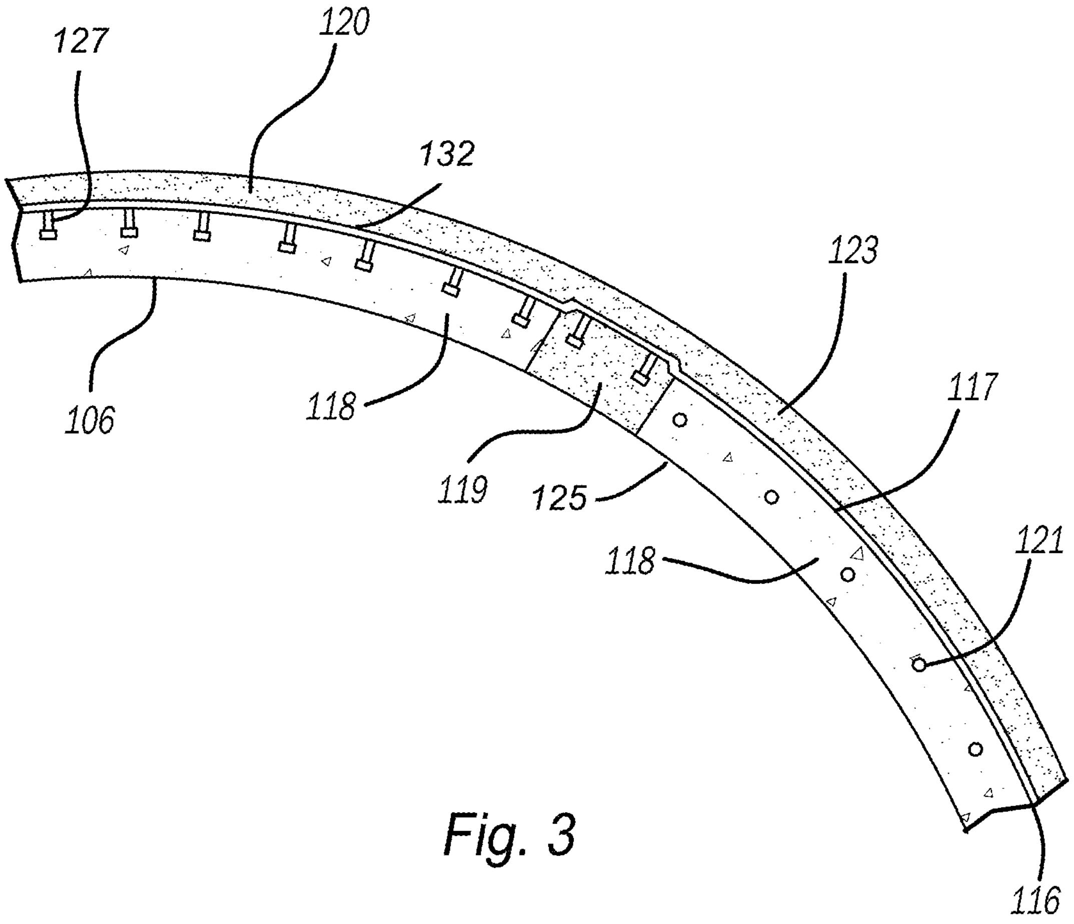
FIG. 3 shows a fragmentary horizontal cross-sectional view of a wall of the secondary container taken along line A-A in FIGS. 1 and 4.
Figure 4:
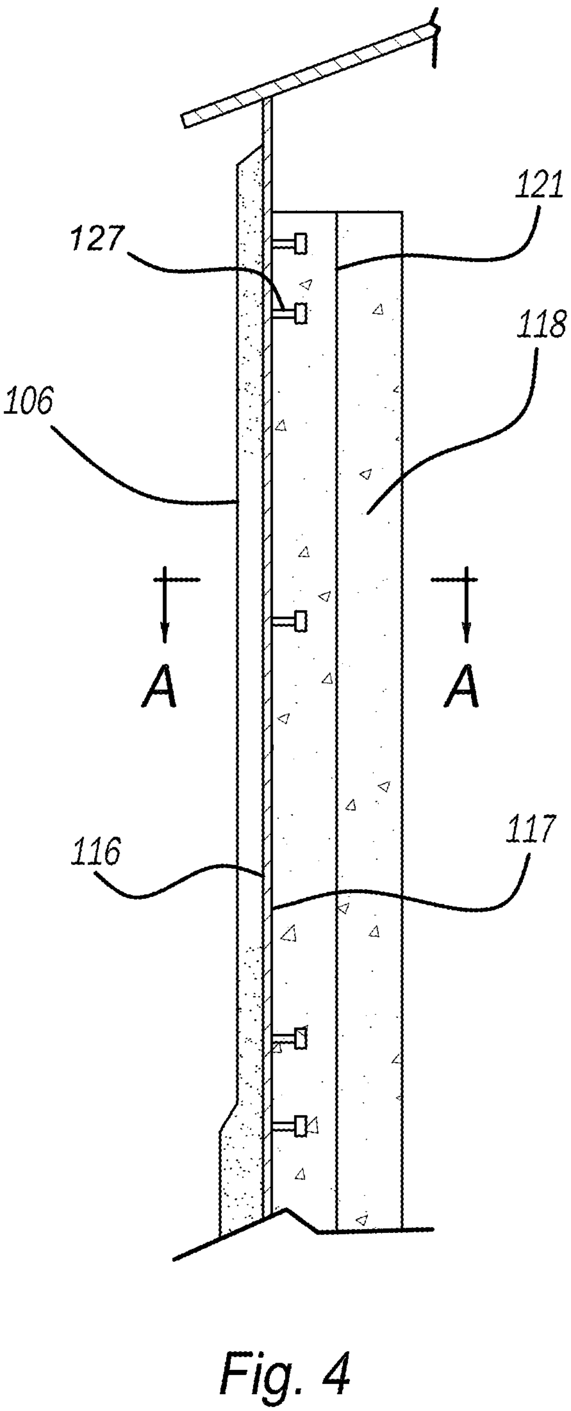
FIG. 4 shows a fragmentary vertical cross-sectional view of a wall of the secondary container.
Figure 5:
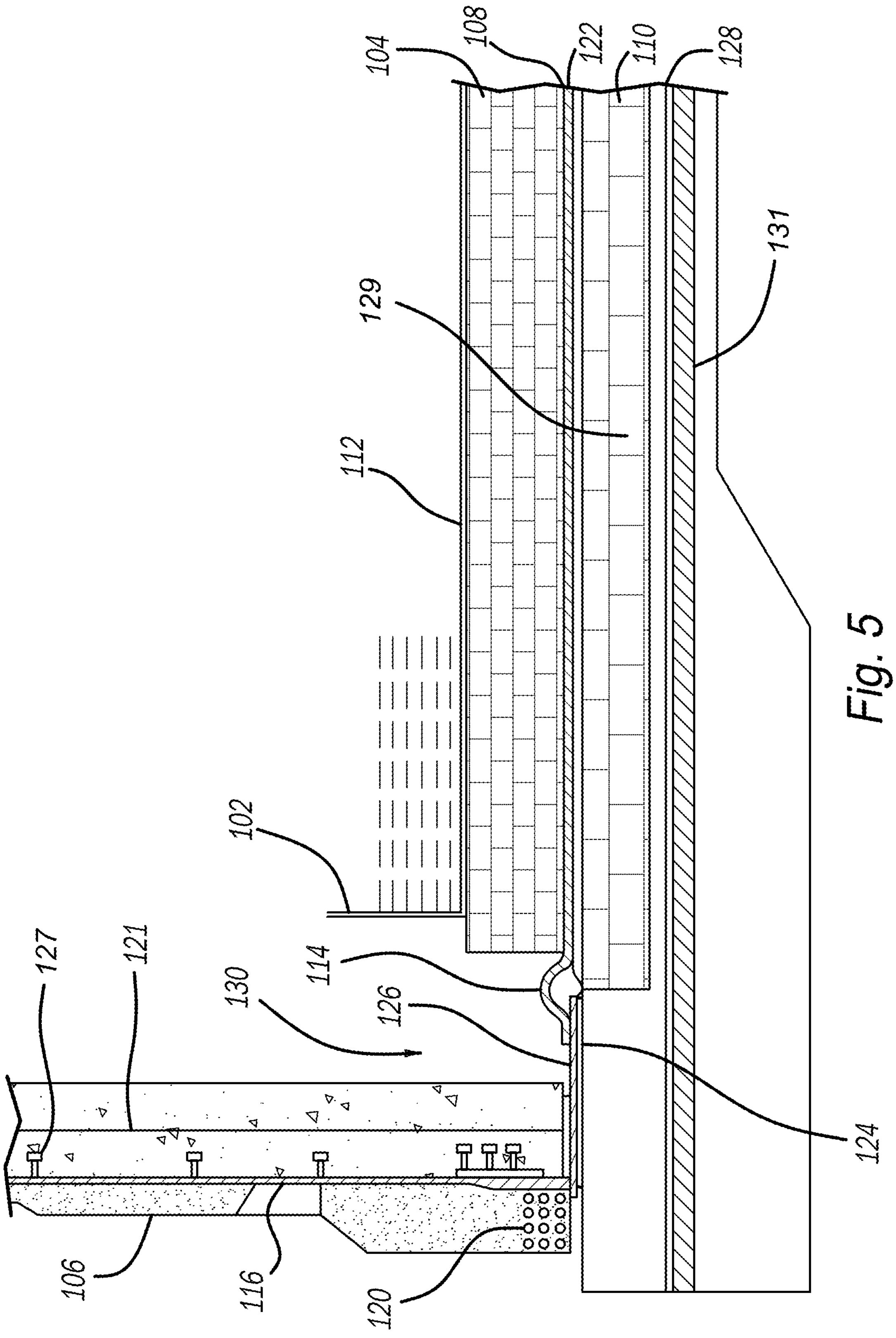
FIG. 5 shows an enlarged fragmentary view of where the secondary bottom is coupled to the secondary container through the expansion joint.

As shown in FIG. 3, the carbon steel liner 116 may be located on the outside face 117 of a precast concrete wall 118, in contrast to its location on the inside face 125 of the wall for known secondary containers with fixed base and the TCP. In certain embodiments, the secondary container 106 may be formed by precast concrete walls 118. The precast concrete walls 118 may have an outer carbon steel liner 116. Prestressed wire 120 may be disposed on an outer surface 132 of the outer carbon steel liner 116. The prestressed wire 120 may compress the secondary container 106 to compensate for the tensile stresses generated by a volume of leaked LNG and resulting thermal gradients. Hence, a certain portion of the secondary container 106 and carbon steel liner 116 may generally remain in compression in conjunction with the prestressed wire 120. The orientation of the prestressed wire 120 may be a vertical orientation, a circumferential orientation, or both. The prestressed wire 120 may be encapsulated with shotcrete to provide protection against corrosion. Vertically placed prestressing wire 121 may be incorporated in the concrete walls 118. A joint 119 between each of the precast concrete walls 118 may also be filled with shotcrete 123. A stud 127 may be welded within the precast concrete wall 118. The carbon steel liner 116 may be located on an outside face 117 of the concrete wall 118. The cryogenic storage system 100 may further include a moisture barrier 129 and an inclinometer 131 disposed below the second insulation layer 110.

The first insulation layer 104 and the second insulation layer 110 may have certain functionalities that may be performed by various types of material. For example, the first insulation layer 104 and the second insulation layer 110 may be constructed from materials that militate against heat loss and are able to withstand a high compressive load. As a non-limiting example, the first insulation layer 104 and the second insulation layer 110 may be constructed from cellular glass insulation, such as FOAMGLAS®, which is commercially available through Owens Corning (Toledo, OH). A skilled artisan may select other suitable materials to construct the first insulation layer 104 and the second insulation layer 110, within the scope of the present disclosure.

In certain embodiments, as shown in FIG. 2, the cryogenic storage system 100 may include ways to accommodate the expansion/retraction of the secondary container 106 where leaked LNG rapidly changes the temperature of the secondary container 106. For instance, the expansion joint 114 of the secondary bottom 108 may be configured to permit the expansion/retraction of the secondary bottom 108 independent from the secondary container 106. The secondary bottom 108 may include a sand layer 122 disposed generally below the primary container 102 and a polytetrafluoroethylene (PTFE) slide bearing 124 disposed generally below the secondary container 106. Advantageously, each of the sand layer 122, the PTFE slide bearing 124, and the expansion joint 114 permit the secondary bottom 108 to move freely, independent from the secondary container 106. Desirably, where the secondary bottom 108 retracts rapidly due to leaked LNG, the free movement of secondary bottom 108 would militate against secondary container 106 from also rapidly moving inward toward a center of the cryogenic storage system 100, thereby also potentially cracking the secondary container 106. In certain embodiments, the sand layer 122 may be replaced with a concrete layer.

Where the secondary bottom 108 is able to move freely, independent from the secondary container 106, the secondary container 106 may include a way to enhance the structural integrity of the cryogenic storage system 100 near where the secondary bottom 108 meets the secondary container 106. For instance, a bottom, outer edge of the secondary container 106 may include a sketch plate 126. The sketch plate 126 may include a thicker portion of steel that is configured to militate against leaked LNG from escaping the cryogenic storage system 100. In certain embodiments, the sketch plate 126 may include approximately 9% nickel. The sketch plate 126 may be disposed above the PTFE slide bearing 124 and/or a bearing pad. One skilled in the art may select other suitable ways of enhancing the structural integrity of the cryogenic storage system 100, near where the secondary bottom 108 meets the secondary container 106, within the scope of the present disclosure.

In certain embodiments, the cryogenic storage system 100 may include ways of keeping the soil beneath the second insulation layer 110 at steady temperature where LNG is leaked within the cryogenic storage system 100. For instance, the cryogenic storage system 100 may further include a thermal element 128 disposed in the soil beneath the second insulation layer 110. The thermal element 128 may be configured to keep the soil under the cryogenic storage system 100 at a constant temperature. Where LNG is leaked within the cryogenic storage system 100, the thermal element 128 may be configured to militate against the soil from rapidly changing temperature.

In the event of an LNG leak from the primary container 102 at any elevation or primary bottom 112, LNG will come in contact with the secondary bottom 108 or the secondary container 106 on the inside face 125. The resulting thermal gradient may cause cracking on the inside surface of the secondary container 106, but the structural integrity and vapor tightness of the steel liner 116 will be maintained. Thus, the vapor loss from the cryogenic storage system 100 will be prevented in the event of the LNG leak, irrespective of the height and volume of the LNG leaked from the primary container.

The location and components of the expansion joint 114, the second insulation layer 110 and its location, and the carbon steel liner 116 located on the outside face 117 of the secondary concrete wall together constitute a novel way of assembling a full containment or a double containment cryogenic storage system for LNG.

Figure 6:
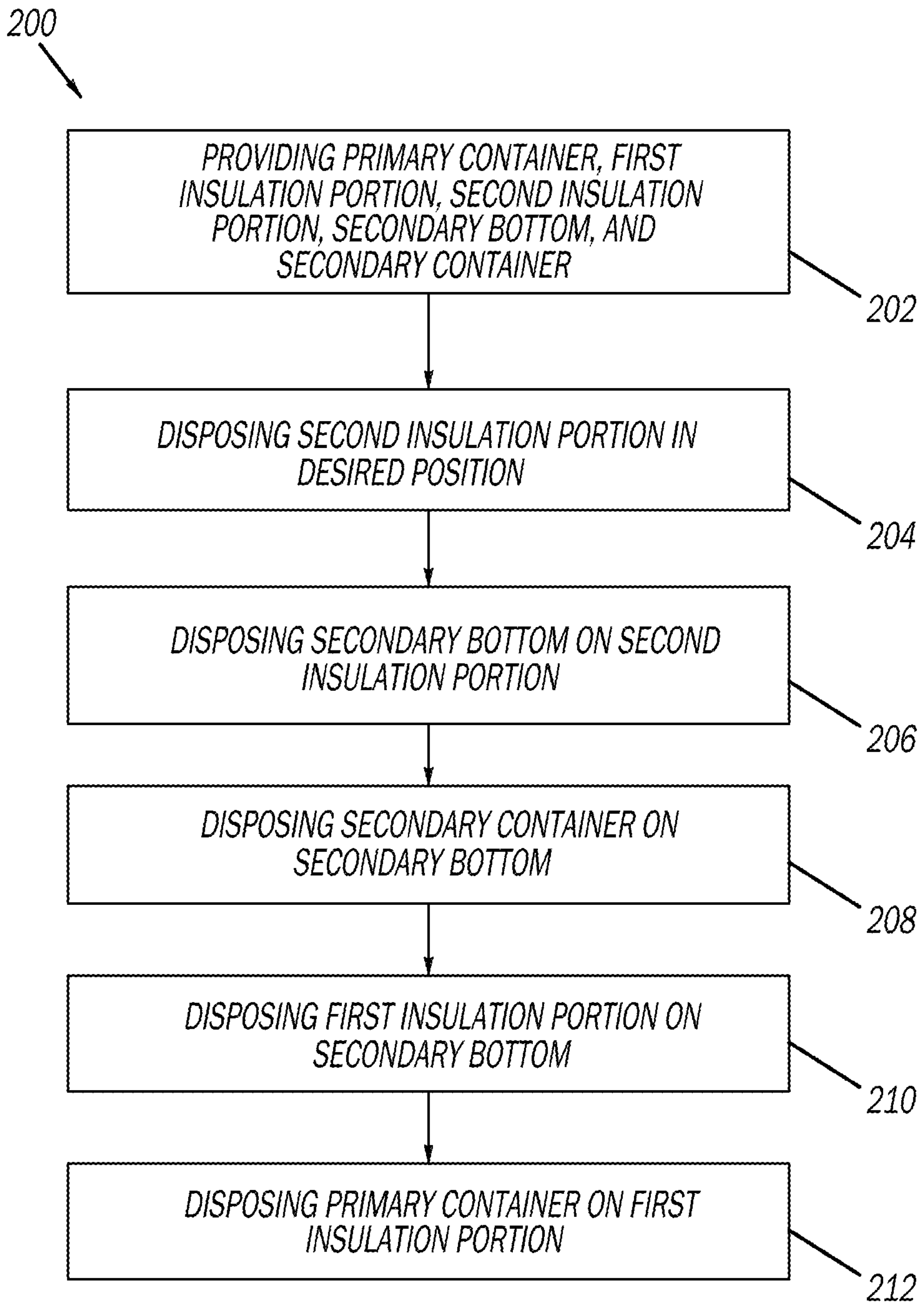
FIG. 6 shows a flowchart of a first embodiment of a method for assembling a cryogenic storage system, in accordance with the present technology.

Various ways of assembling the cryogenic storage system 100 are provided. FIG. 6 shows a method 200 of assembling the cryogenic storage system 100. The method 200 may include a step 202 of providing a primary container 102 having a primary bottom 112, a first insulation layer 104, a secondary container 106 a secondary bottom 108, and a second insulation layer 110. The secondary bottom 108 may have an expansion joint 114. Next, the method 200 may include a step 204 of disposing the second insulation layer 110 in a desired position. The secondary bottom 108 may then be disposed on the second insulation layer 110. Then, the secondary container 106 may be placed on the secondary bottom 108. Afterwards, the first insulation layer 104 may be positioned on the secondary bottom 108 of the secondary container 106. Then, the primary container 102 may be disposed on the first insulation layer 104. In certain embodiments, an annular space 130 may be created between the primary container 102 and the secondary container 106. Advantageously, the annular space 130 may militate against the temperature of the LNG from conducting with the secondary container 106.

Figure 7:
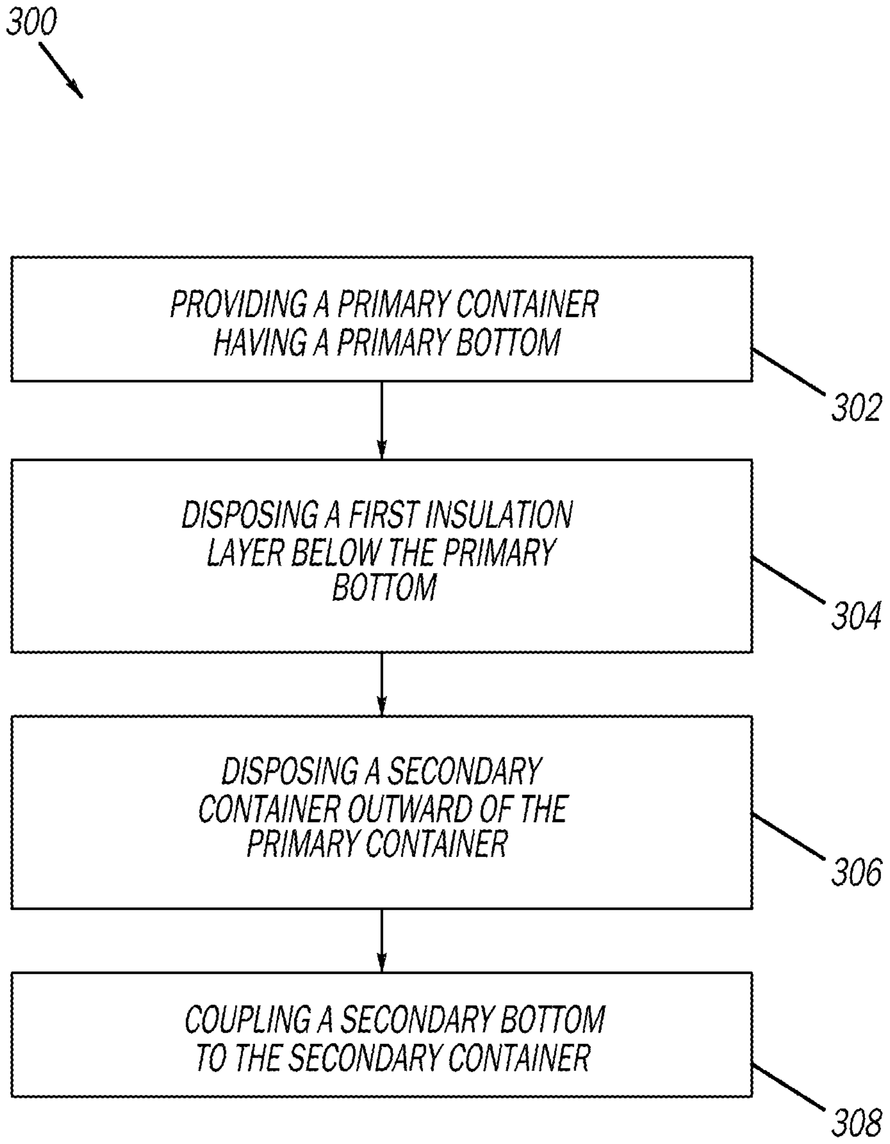
FIG. 7 shows a flowchart of a second embodiment of a method for assembling a cryogenic storage system, in accordance with the present technology.

FIG. 7 shows a method 300 of assembling the cryogenic storage system 100 in accordance with further embodiments. As shown in FIG. 7, in step 302, the method 300 may include providing a primary container 102 having a primary bottom 112. In step 304, a first insulation layer 104 may be disposed below the primary bottom 112. Then, in step 306, a secondary container 106 may be disposed outward of the primary container 102 and in step 308, the method may include coupling a secondary bottom 108 to the secondary container 106 through an expansion joint 114. The expansion joint 114 may be configured to permit an expansion and a retraction of the secondary bottom 108 independent from the secondary container 106. A sand layer 122, a slide bearing 124, and the expansion joint 114 may permit the secondary bottom 108 to move independent from the secondary container 106. In certain embodiments, the method may comprise storing a cryogenic liquid in the cryogenic storage system 100. The cryogenic liquid may be LNG.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A cryogenic storage system, comprising:

a primary container;

a first insulation layer disposed below a primary bottom of the primary container;

a secondary container disposed outward of the primary container;

a secondary bottom disposed below the primary bottom of the primary container, the secondary bottom coupled to the secondary container through an expansion joint, the expansion joint configured to permit an expansion and a retraction of the secondary bottom independent from the secondary container;

a thermal element disposed below each of the primary container, the first insulation layer, the secondary container, and the secondary bottom; and a second insulation layer disposed below the secondary bottom, the second insulation layer including a moisture barrier and an inclinometer disposed below the second insulation layer.

2. The cryogenic storage system of claim 1, wherein each of the first insulation layer and the second insulation layer includes cellular glass insulation.

3. The cryogenic storage system of claim 1, wherein the thermal element is disposed in soil beneath the second insulation layer, and the thermal element is configured to militate against a rapid change in temperature of the soil if a cryogenic liquid leaks from the cryogenic storage system.

4. A cryogenic storage system, comprising:

a primary container;

a first insulation layer disposed below a primary bottom of the primary container;

a secondary container disposed outward of the primary container;

a secondary bottom disposed below the primary bottom of the primary container, the secondary bottom coupled to the secondary container through an expansion joint, the expansion joint configured to permit an expansion and a retraction of the secondary bottom independent from the secondary container; and a thermal element disposed below each of the primary container, the first insulation layer, the secondary container, and the secondary bottom, wherein the secondary bottom includes a sand layer below the primary container and a slide bearing below the secondary container.

5. The cryogenic storage system of claim 4, wherein the sand layer, the slide bearing, and the expansion joint permit the secondary bottom to move independent from the secondary container.

6. The cryogenic storage system of claim 5, further including a sketch plate disposed above the slide bearing, where the sketch plate is configured to militate against a leaked cryogenic liquid from escaping the cryogenic storage system.

7. The cryogenic storage system of claim 6, wherein the sketch plate includes steel that is configured to militate against the leaked cryogenic liquid from escaping the cryogenic storage system, and the sketch plate includes approximately 9% nickel.

8. The cryogenic storage system of claim 1, further comprising a cryogenic liquid stored therein.

9. The cryogenic storage system of claim 1, wherein the secondary container includes an outer carbon steel liner.

10. The cryogenic storage system of claim 1, wherein each of the primary container, the primary bottom, and the secondary bottom include one of nickel based steel and stainless steel.

11. The cryogenic storage system of claim 1, wherein the secondary container includes one of a precast prestressed concrete wall and a cast-in-place prestressed concrete wall.

12. The cryogenic storage system of claim 11, wherein the secondary container further includes a carbon steel liner disposed on an outside face of the secondary container.

13. The cryogenic storage system of claim 1, wherein the secondary container includes a secondary container wall, and an entirety of the secondary container wall is circumferentially prestressed using high strength steel wires encapsulated in shotcrete.

14. The cryogenic storage system of claim 1, wherein the secondary container includes a plurality of precast concrete walls and an outer carbon steel liner.

15. The cryogenic storage system of claim 14, wherein prestressed wire is disposed on an outer surface of the outer carbon steel liner.

16. The cryogenic storage system of claim 1, wherein the second insulation layer is disposed below a concrete footing of the secondary bottom in a reservoir.

17. A method of assembling a cryogenic storage system, the method comprising:

disposing a primary container having a primary bottom on a first insulation layer;

disposing a secondary container around the primary container; and coupling a secondary bottom to the secondary container through an expansion joint, the secondary bottom disposed below the primary bottom, the expansion joint configured to permit an expansion and a retraction of the secondary bottom independent from the secondary container, and a thermal element is disposed below each of the primary container, the first insulation layer, the secondary container, and the secondary bottom, wherein:

the secondary bottom includes a sand layer below the primary container and a slide bearing below the secondary container; and the sand layer, the slide bearing, and the expansion joint permit the secondary bottom to move independent from the secondary container.

18. The method of claim 17, further comprising disposing an outer carbon steel liner onto the secondary container.

* * * * *